(12) United States Patent
Gigandet

(10) Patent No.: US 12,732,732 B2
(45) Date of Patent: Sep. 8, 2026

(54) ASSISTIVE LISTENING DEVICE AND SYSTEM AND METHOD FOR PROVIDING HEARING ASSISTANCE

(71) Applicant: SONOVA AG, Staefa (CH)

(72) Inventor: Xavier Gigandet, Cousset (CH)

(73) Assignee: Sonova AG, Staefa (CH)

( * ) Notice: Subject to any disclaimer, the term of this patent is extended or adjusted under 35 U.S.C. 154(b) by 231 days.

(21) Appl. No.: 18/632,879

(22) Filed: Apr. 11, 2024

(65) Prior Publication Data

US 2024/0348963 A1 Oct. 17, 2024

(30) Foreign Application Priority Data

Apr. 14, 2023 (EP) .................................... 23167925

(51) Int. Cl.
*H04R 5/033* (2006.01)
*G06F 3/16* (2006.01)
(Continued)

(52) U.S. Cl.
CPC ........... *H04R 1/1041* (2013.01); *G06F 3/162* (2013.01); *H04R 5/033* (2013.01); *H04S 1/007* (2013.01);
(Continued)

(58) Field of Classification Search
CPC .. H04R 1/1041; H04R 5/033; H04R 2420/07; H04R 2420/09; G06F 3/162; H04S 1/007
(Continued)

(56) References Cited

U.S. PATENT DOCUMENTS 8,670,584 B2 * 3/2014 Moran ................. H04R 25/554 379/431
2010/0042826 A1 2/2010 Bull et al.
(Continued)

FOREIGN PATENT DOCUMENTS

EP 1981253 B1 10/2008
EP 2675189 A1 12/2013
(Continued)

OTHER PUBLICATIONS

European Search Report and Written Opinion received Oct. 9, 2023 in International Application No. 23167925.9.

*Primary Examiner* — Carolyn R Edwards
*Assistant Examiner* — Friedrich Fahnert
(74) *Attorney, Agent, or Firm* — ALG Intellectual Property, LLC

(57) ABSTRACT

An assistive listening device includes a microphone arrangement for capturing an input microphone audio signal; a microphone signal processing unit for processing the input microphone audio signal so as to generate a processed microphone audio signal; a USB interface for connecting to a communication device, the USB interface comprising a USB audio input port to receive a USB input audio signal from the communication device and a USB audio output port to transmit a USB output audio signal to the communication device; a USB audio signal processing unit for processing the USB input audio signal so as to generate a processed USB input audio signal; a wireless interface for transmitting an output audio signal via a wireless link to a hearing device; and a control unit for selecting one of a first, second and third streaming mode and for operating the assistive listening device according to the selected streaming mode.

15 Claims, 3 Drawing Sheets

(51) Int. Cl.
*H04R 1/10* (2026.01)
*H04S 1/00* (2006.01)

(52) U.S. Cl.
CPC ...... *H04R 2420/07* (2013.01); *H04R 2420/09* (2013.01)

(58) Field of Classification Search
USPC .......................................................... 381/303
See application file for complete search history.

(56) References Cited

U.S. PATENT DOCUMENTS

| | | | | |
|---|---|---|---|---|
| 2014/0321658 | A1* | 10/2014 | Rahangdale | H04R 5/033<br>381/334 |
| 2017/0318374 | A1 | 11/2017 | Dolenc et al. | |
| 2021/0409879 | A1* | 12/2021 | Riemer | H04R 25/554 |
| 2023/0199385 | A1* | 6/2023 | Wu | H04R 1/105<br>381/74 |
| 2024/0319958 | A1* | 9/2024 | Jeong | H04N 21/42203 |

FOREIGN PATENT DOCUMENTS

| | | | |
|---|---|---|---|
| WO | 2008010716 | A2 | 1/2008 |
| WO | 2022056126 | A1 | 3/2022 |

* cited by examiner

ASSISTIVE LISTENING DEVICE AND SYSTEM AND METHOD FOR PROVIDING HEARING ASSISTANCE

RELATED APPLICATIONS

The present application claims priority to EP Patent Application No. 23167925.9, filed Apr. 14, 2023, the contents of which are hereby incorporated by reference in their entirety.

BACKGROUND INFORMATION

Described herein are an assistive listening device for streaming audio signals via a wireless link to a hearing device, comprising a microphone arrangement for capturing audio signals.

In the field of assistive listening devices, a remote microphone is mainly used to pick up the sound from the environment—e.g. voice from a speaker in a meeting, or from a group of people around a table, or any other situation—and transmit the resulting signal wirelessly to the hearing device(s) of a hearing impaired person, by means of receivers worn on the hearing device(s) or around the body, resulting in an improved intelligibility.

Assistive listening devices may also be used to cover additional use cases like audio streaming. In these situations, the assistive listening device is used as a relay between an audio source (e.g. a MP3 player) and the hearing devices: it receives the signal from the audio device by means of an audio connection—analog or digital (e.g. line input, optical cable, or else) —and transmits this signal wirelessly to the hearing devices.

Likewise, audio streaming can be done with a computer through a USB interface to the assistive listening device. The audio output from the computer can be received from the USB interface of the assistive listening device and transmitted wirelessly to the hearing devices.

In some applications, the computer may require an audio input—a microphone signal—for capturing the voice of the user. A typical example of this is with a communication application for audio and/or video conference, where the user can have a conversation with online participants. In the case of a hearing device user, the assistive listening device can be connected to the computer over the USB interface to be able to stream the audio signal from the computer to the hearing aids. Additionally, the user has to setup a microphone so that the online participants can be heard. The user can use a third-party microphone, connect it to the computer and set it as the microphone device to be used for the communication application. Alternatively, he may make use of a built-in microphone of the computer.

However, these solutions may not be optimal. In the first case, the setup of an additional device may be cumbersome for the user. In the second case, the availability and sound quality of the built-in microphone is dependent on the computer, which can result in a compromised sound quality for the online participants.

WO 2022/056126 A1 discloses a wearable audio playback device comprising two modes. The first mode collects microphone signals from a microphone of the audio playback device to output them via one or more electroacoustic transducers to the wearer. In the second mode the audio playback device receives an audio stream via a wireless transmitter from an external audio source and outputs the received audio signals via the one or more electroacoustic transducers to the wearer. Mode switching can be done based on a user input (button or voice command), or automatically from a source presence detection.

EP 2675189 A1 discloses a system comprising an assistive listening device with a microphone and a wireless interface for streaming audio signals from audio sources like a phone, a computer or a TV set to a binaural hearing system. The assistive listening device also comprises a user interface for selecting different streaming modes, e.g. a phone mode or an TV mode.

EP 1981253 B1 relates to an assistive listening device for wireless audio streaming which can be recharged via a USB port and which has a microphone which is active only during a phone call; it also has a 2.5 mm jack connector for receiving audio input.

WO 2008/010716 A2 relates to an assistive listening device for wireless audio streaming which may have a USB interface.

US 2010/0042826 A1 discloses a method of establishing an operating state of a portable device, by which the device receives identifying information from an external device, and the identifying information is used to determine whether there exists previously stored state information that is associated with the identifying information.

BRIEF DESCRIPTION OF THE DRAWINGS

Hereinafter, examples of the invention will be illustrated by reference to the attached drawings, wherein.

DETAILED DESCRIPTION

Figure 1:
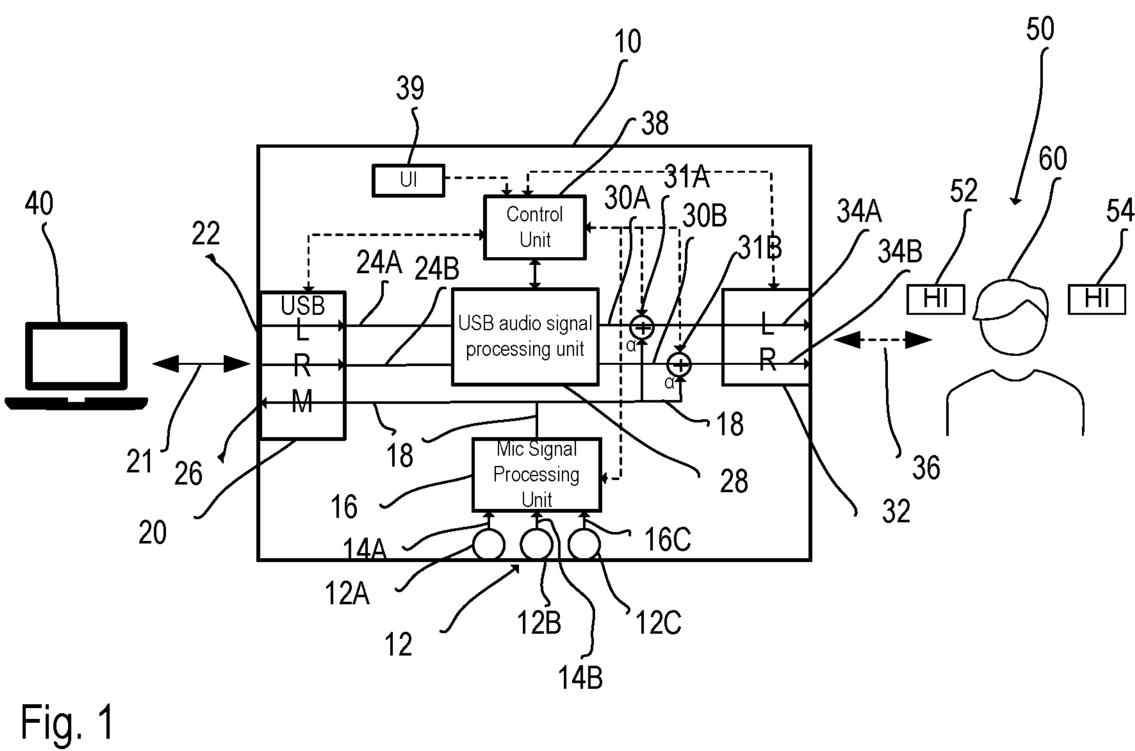
FIG. 1 is a schematic illustration of an example of a hearing assistance system when operating according to an example of a two-way USB streaming mode.

Embodiments described herein may provide for an assistive listening device which can be used simultaneously with a communication device and with a hearing device in a user friendly manner and which eliminates the need for a microphone of the communication device.

In some examples, in addition to two streaming modes wherein either audio signals captured by the microphone arrangement of the assistive listening device or audio signals received via a USB interface from a communication device are transmitted to the hearing device a third streaming mode is provided wherein audio signals captured by the microphone arrangement of the assistive listening device are supplied via the USB interface to the communication device while streaming audio signals from the communication device to the hearing device, with the appropriate streaming mode being automatically selected depending on the use situation. Thereby the assistive listening device can be used—together with the hearing device—as a combined microphone and speaker device. For example, the assistive listening device thus may be used—together with the communication device—for meetings with online participants, without the need to set up any additional devices; in particular, the need to use an additional microphone in the online meeting, such as a microphone of the communication device is eliminated. Further, the automatic mode selection allows for user friendly operation of the assistive listening device.

According to one example, the USB interface and the USB audio signal processing unit are not active in the first streaming mode.

According to one example, the microphone signal processing unit is not active in the second streaming mode.

According to one example, the control unit is configured to allow in the second streaming mode to select an ambient sub-mode in which, in addition, an input microphone audio signal is captured, by the microphone arrangement, the input microphone audio signal is processed so as to generate a processed microphone audio signal, and the processed microphone audio signal is weighted and added to the processed USB input audio signal to generate a combined audio signal which is supplied to the wireless interface as said output audio signal. In particular, the control unit may be configured to allow the user to select the ambient sub-mode by interaction with a user interface, which, for example, may comprises a button.

According to one example, the control unit is configured to allow in the third streaming mode to select a sidetone sub-mode in which, in addition, the processed microphone audio signal is weighted and added to the processed USB input audio signal to generate a combined audio signal which is supplied to the wireless interface as said output audio signal. In particular, the control unit may be configured to allow the user to select the sidetone sub-mode by interaction with a user interface.

According to one example, the control unit is configured to first check whether or not a USB connection at the USB interface is detected, wherein the first streaming mode is selected as long as no USB connection is detected, and wherein the second streaming mode is selected when a USB connection is detected and as long as no request for a USB output audio signal is received. In particular, the control unit may be configured to switch from the second streaming mode into the third streaming mode as soon as a request for a USB output audio signal is received. Further, the control unit may be configured to switch from the second or third streaming mode, respectively, into the first streaming mode as soon as it is detected that the USB connection is no longer present. Also, the control unit may be configured to allow the user to override the automatic streaming mode selection of the control unit so as to switch from the third streaming mode into the second streaming and optionally back by interaction with a user interface.

According to another example, the control unit may be configured to directly switch from the first streaming mode into the third streaming mode as soon as a USB connection is detected and a request for a USB output audio signal is received.

According to one example, the USB audio signal processing unit may be configured to apply at least one of a gain model, equalization and level limiting to the USB input audio signal.

According to one example, the microphone signal processing unit may be configured to apply at least one of noise cancellation, a gain model, equalization and level limiting to the input microphone audio signal.

According to one example, the microphone arrangement comprises a plurality of spaced apart microphones and the microphone signal processing unit is configured to apply acoustic beamforming to the input microphone audio signal.

According to one example, the USB input audio signal is a stereo audio signal, and also the processed USB input audio signal may be a stereo audio signal. In particular, the wireless interface may be configured to transmit the processed USB input audio signal as a stereo signal to a binaural hearing system including the hearing device. or the assistive listening device may be configured to downmix the stereo processed USB input audio signal into a mono signal to be transmitted by the wireless interface.

According to one example, the USB output audio signal is a mono audio signal.

According to one example, the assistive listening device is a hand-held device, a body-worn device or a table device.

According to one example, a hearing assistance system comprises the assistive listening device, the hearing device and the communication device.

According to one example, the communication device is a computer, such as a PC, a laptop computer or a tablet computer.

According to one example, the communication device is configured to run an audio conference and/or a video conference program, wherein the USB input audio signal is provided by the conference program and the USB output audio signal is used by the conference program.

According to one example, the hearing device forms part of a binaural hearing system.

A "hearing device" as used hereinafter is any ear level element suitable for reproducing sound by stimulating a user's hearing, such as an electroacoustic hearing aid, a bone conduction hearing aid, an active hearing protection device, a hearing prostheses element such as a cochlear implant, a wireless headset, an earbud, an earplug, an earphone, etc.

A "communication device" as used hereinafter may be any device which allows a user to communicate/exchange audio data, in particular representative of speech, and optionally video data, with other devices, in particular via a communication network, such as the internet or a phone network.

"Acoustic streaming" as used hereinafter is meant to describe the "classical" operating mode of an assistive listening device as a remote microphone without USB connection, i.e. with an audio signal captured by the microphone arrangement of the assistive listening device being sent to the hearing device.

"One-way USB streaming" and "two-way USB streaming" as used hereinafter are meant to describe unidirectional and bidirectional audio signal streaming, respectively, via the USB port of the assistive listening device.

FIG. 1 is a schematic illustration of an example of a hearing assistance system comprising an assistive listening device 10, a communication device 40, e.g., computer, such as a PC (Personal Computer), a laptop computer or a tablet computer, and a binaural hearing system 50 comprising two hearing device 52, 54 worn by a user 60.

The assistive listening device 10 may be, for example, a hand-held or body-worn device (e.g., worn at the chest by a loop around the neck) or a table device, and comprises a microphone arrangement 12 for capturing an input microphone audio signal from a sound environment, such as a person's voice, in particular the voice of the user 60 of the hearing devices 52, 54.

The microphone arrangement 12 may comprise a plurality of spaced apart microphones 12A, 12B, 12C so as to allow for acoustic beamforming. The captured microphone audio signal (in case of a plurality of microphones 12A-C the captured microphone audio signal actually consists of three component/channels 14A-C, one for each microphone 12A-C) is supplied to a microphone signal processing unit 16 for processing the input microphone audio signal 14A-C so as to generate a processed microphone audio signal 18.

The microphone signal processing unit 16 may be configured to apply, for example, noise cancellation, a gain model, equalization and/or level limiting to the input microphone audio signal 14A-C. Further, in case of a plurality of spaced apart microphones 12A-C, and the microphone signal processing unit 16 may apply acoustic beamforming to the input microphone audio signal 14A-C.

The assistive listening device 10 further comprises a USB interface 20 for establishing a USB connection 21 to the communication device 40. The USB interface 20 includes a USB audio input port 22 to receive a USB input audio signal 24A, 24B from the communication device and a USB audio output port 26 to transmit a USB output audio signal (which may be formed by the processed microphone audio signal 18) to the communication device 40. The USB input audio signal may be a stereo signal comprising two channels 24A, 24B.

The USB input audio signal 24A,B is supplied a USB audio signal processing unit 28 of the assistive listening device 10 for processing the USB input audio signal 24A,B so as to generate a processed USB input audio signal 30A, 30B. The USB audio signal processing unit 28 may be configured, for example, to apply a gain model, equalization and/or level limiting to the USB input audio signal 24A,B.

The processed USB input audio signal 30A, 30B is supplied to a wireless interface 32 of the assistive listening device 10 for transmitting an output audio signal, which may comprise two channels 34A, 34B, via a wireless link 36 to the hearing devices 52, 54. The output audio signal 34A,B may be formed by the processed USB input audio signal 30A, B or by the processed microphone audio signal 18 or by a combination of the processed USB input audio signal 30A,B and the processed microphone audio signal 18 (for combining the respective signals a signal combiner 31A, 31B may be provided). The wireless interface 32 may be, for example, a Bluetooth interface, such as a Bluetooth Low Energy or a Bluetooth Low Energy Audio interface.

The assistive listening device 10 further comprises a control unit 38 for selecting one of a first, second and third streaming mode and for operating the assistive listening device 10 according to the selected streaming mode. The control unit 38 may communicate with the USB interface 20, the USB audio signal processing unit 28, the microphone signal processing unit 16, the wireless interface 32 and with the signal combiners 31A, 31B.

Figure 2:
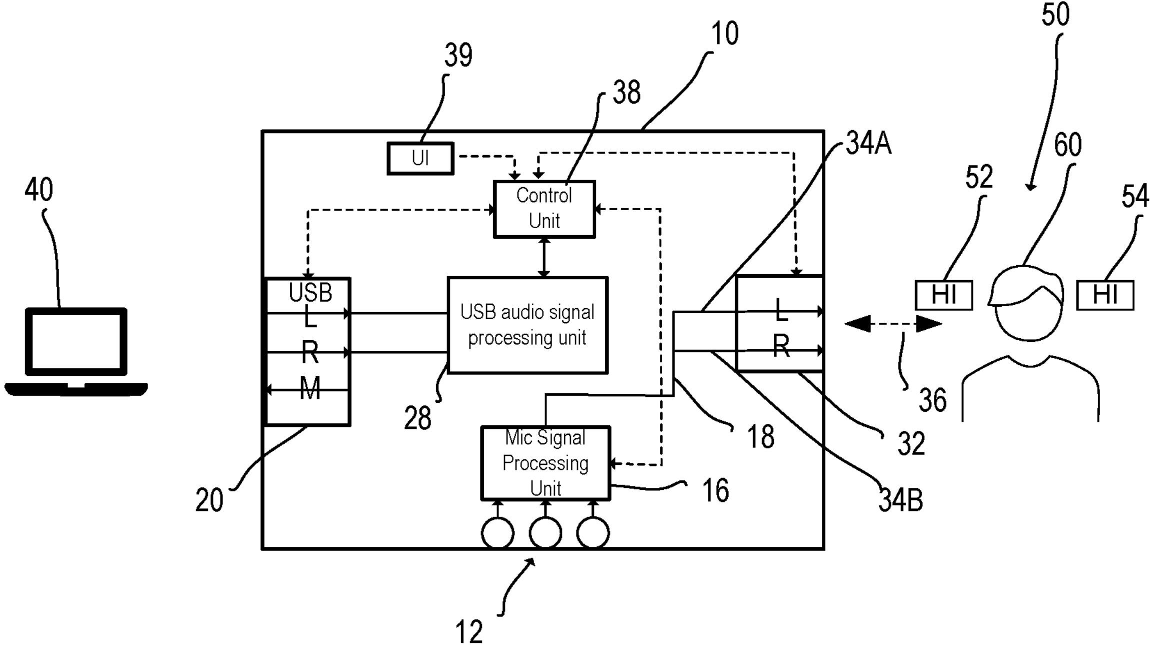
FIG. 2 is a schematic illustration of the system of FIG. 1 when operating according to an example of an acoustic streaming mode.

The first streaming mode, which also may be labeled "acoustic streaming mode", is illustrated in FIG. 2. This may be the default operating state of the assistive listening device 10, picking up sound from the environment, in particular a person's voice, by the microphone arrangement 12, supplying the resulting processed microphone audio signal 18 wirelessly to the wireless interface 32 for transmission via the link 36 to the hearing device 52, 54 of the user 60.

It is to be understood that the "acoustic streaming mode" may have several "sub-modes" so as to cover different use cases, for example, a table mode, a lapel mode and a hand-held mode. Each of these sub-modes may have its particular configuration of the microphone signal processing unit 16, and the switching between these sub-modes may be based, for example, on user input (e.g. a mode button or via a smartphone app) or based on a sensor, like an accelerometer.

The USB interface 20 and the USB audio signal processing unit 28 are not active in the first streaming mode.

The assistive listening device 10 remains in the first streaming mode as long as no USB connection 21 at the USB interface 20 is detected by the control unit 38.

Figures 3, 4, 5:
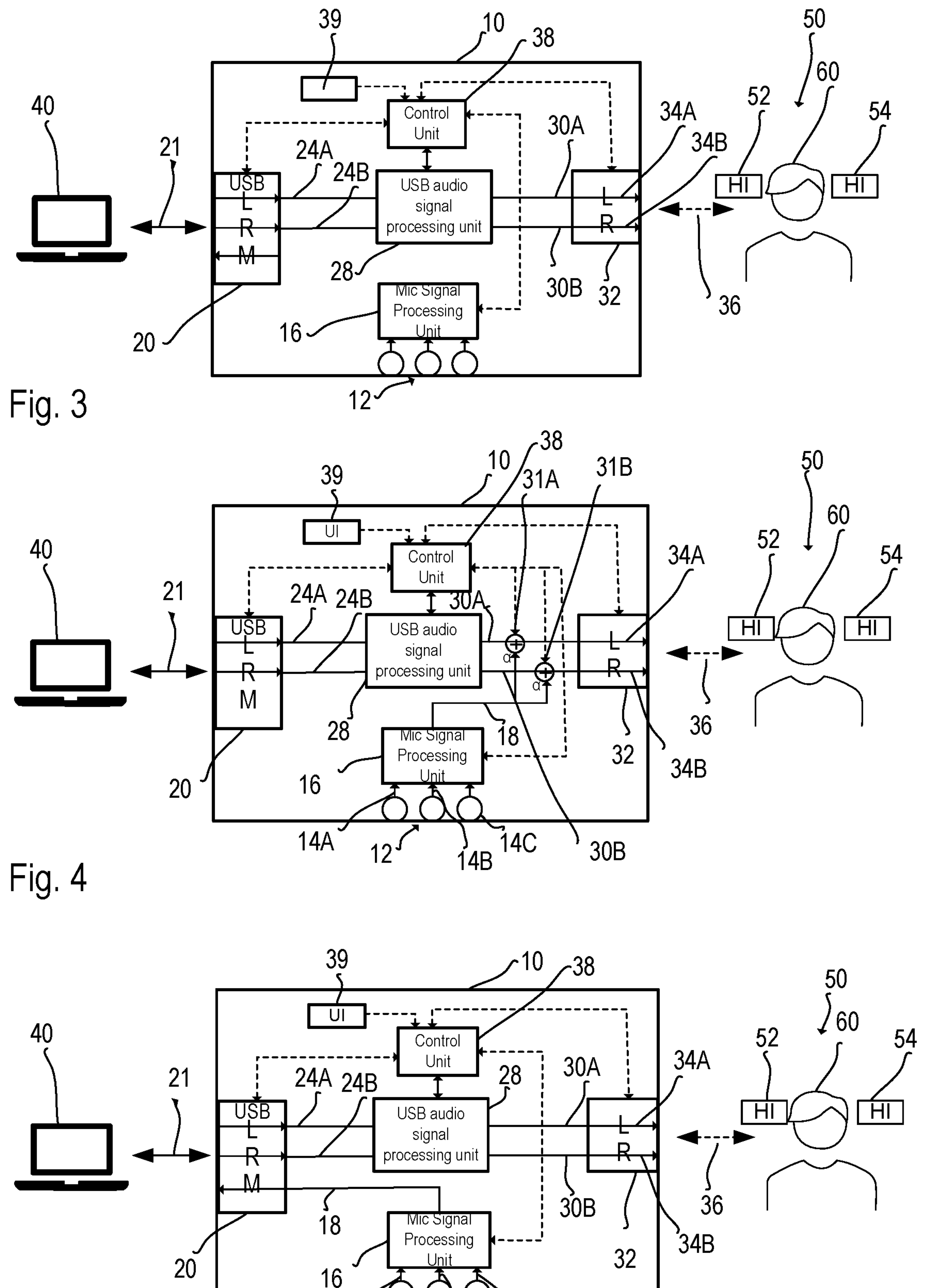
FIG. 3 is a schematic illustration of the system of FIG. 1 when operating according to a first example of a one-way USB streaming mode.
FIG. 4 is a schematic illustration of the system of FIG. 1 when operating according to a second example of a one-way USB streaming mode.
FIG. 5 is a schematic illustration of the system of FIG. 1 when operating according to another example of a two-way USB streaming mode.

The second streaming mode may be labeled "one-way USB streaming mode". A first example of the second streaming mode is illustrated in FIG. 3.

This operating state is used for streaming an audio signal from the communication device to the hearing devices 52, 54, i.e., assistive listening device 10 is used as a relay between the communication device 40 and the hearing device s 52, 54, allowing the audio signals from the communication device 40 to be transmitted wirelessly to the hearing devices 52, 54 of the user 60.

In this operating state, the audio signal 24A,B obtained from the communication device 40 through the USB interface 20 is collected and processed by the USB audio signal processing unit 28 and the processed USB input audio signal 30A,B is supplied to the wireless interface 32 for transmission to the hearing device 52, 54.

The control unit 38 may select the second streaming mode when the control 38 detects a USB connection 21 at the USB interface 20, while the communication device 40 does not request a USB output audio signal (it is to be understood that the "USB output audio signal" is an output signal of the assistive listening device 10 which is supplied as an input signal to the communication device 40).

In the example of the second streaming mode illustrated in FIG. 3 the microphone signal processing unit 16 is not active, so that the sound from the environment of the assistive listening device 10 is not picked up by the microphone arrangement 12.

However, there may be cases for which an acoustic sound pickup is desired, for example if another person wants to communicate with the hearing devices user 60. In such a case, in the example of the second streaming mode illustrated in FIG. 3 the user 60 would have to disconnect the assistive listening device 10 from the communication device 40 or configure the hearing devices 52, 54 to leave the second audio streaming mode.

A modified example of the second streaming mode suitable for addressing this use case is illustrated in FIG. 4 (which may be labelled, for example, "ambient sub-mode"), wherein the microphone audio signal processing unit 16 is kept active so as to provide a processed microphone audio signal 18 which is added to the processed USB input audio signal 30A, 30B with a predefined weight $\alpha$ in the signal combiner 31A, 31B so as to supply a combined signal 34A, 34B to the wireless interface 32 for transmission to the hearing devices 52, 54. This allows the user 60 to hear simultaneously the audio signal from the communication device 40 and the local sound environment, as picked up by the assistive listening device 10.

It is to be noted that the "classical" one-way USB streaming mode illustrated in FIG. 3 can be implemented in the modified example of FIG. 4 by simply setting the weight $\alpha=0$. For the one-way USB streaming mode with additional microphone signal one would use a predefined weight $\alpha>0$. The user 60 may switch manually between those two configurations of the one-way USB streaming mode by means of a user interface 39, e.g. a button, of the assistive listening device 10.

The third streaming mode may be labeled "two-way USB streaming mode". A first example of the third streaming mode is illustrated in FIG. 5.

This operating state may be used, for example, for audio and/or video conference applications, i.e., the assistive listening device 10 may be used simultaneously as a relay between the communication device 20 and the hearing devices 52, 54, allowing the audio signal from the communication device 40 to be wirelessly transmitted to the hearing devices 52, 54 of the user 60 and as a classical USB microphone, allowing to pick up the sound from the environment and transmitting it to the computer over the USB interface.

In this operating state, the audio signal from the communication device 40 obtained through the USB interface 20 is collected and processed by the USB audio signal processing unit 28 and the resulting processed USB input audio signal 30A, 30B is supplied to the wireless interface 32 for transmission to the hearing devices 52, 54.

Simultaneously, the input microphone audio signal 14A-C captured by the microphone arrangement 12 is collected by the microphone signal processing unit 16 and the resulting processed microphone audio signal 18 is supplied to the USB interface 20 for being sent to the communication device 40.

It is to be understood that, similar to the "acoustic streaming mode", also the "two-way USB streaming mode" may have several "sub-modes" so as to cover different use cases, for example, a table mode, a lapel mode and a hand-held mode. As such, the two-way streaming mode may be configured automatically or manually for each of these use cases, wherein only the configuration of the microphone signal processing unit 16 would differ between those sub-modes.

The third streaming mode is selected by the control unit 38 when a USB connection 21 to the communication device 40 is detected by the control unit 38, while the communication device 40 requests a USB output audio signal.

When the device is operating in two-way USB streaming state according to the example illustrated in FIG. 5, the sound from the environment is picked up by the assistive listening device 10, but the resulting audio signal is sent to the communication device 40 only. However, there may be cases for which an environment sound pickup is desired as well for the hearing device user 60, as an indication of active transmission (this is known in communication theory under the term "sidetone").

A modified example of the third streaming mode suitable for addressing this use case is illustrated in FIG. 1 (which may be labelled, for example, "sidetone sub-mode"), wherein the processed microphone audio signal 18 is added to the processed USB input audio signal 30A, 30B with a predefined weight $\alpha$ in the signal combiner 31A, 31B so as to supply a combined signal 34A, 34B to the wireless interface 32 for transmission to the hearing devices 52, 54, similar to the example of FIG. 4. This allows the user 60 to hear simultaneously the audio signal from the communication device 40 and the local sound environment, as picked up by the assistive listening device 10.

It is to be noted that the "classical" two-way USB streaming mode illustrated in FIG. 5 can be implemented in the modified example of FIG. 1 by simply setting the weight $\alpha=0$. For the two-way USB streaming mode with additional microphone signal one would use a predefined weight $\alpha>0$. The user 60 may switch manually between those two configurations of the one-way USB streaming mode by means of a user interface 39, e.g. a button, of the assistive listening device 10, or one of the two examples of the third streaming mode may be preconfigured.

Figure 6:
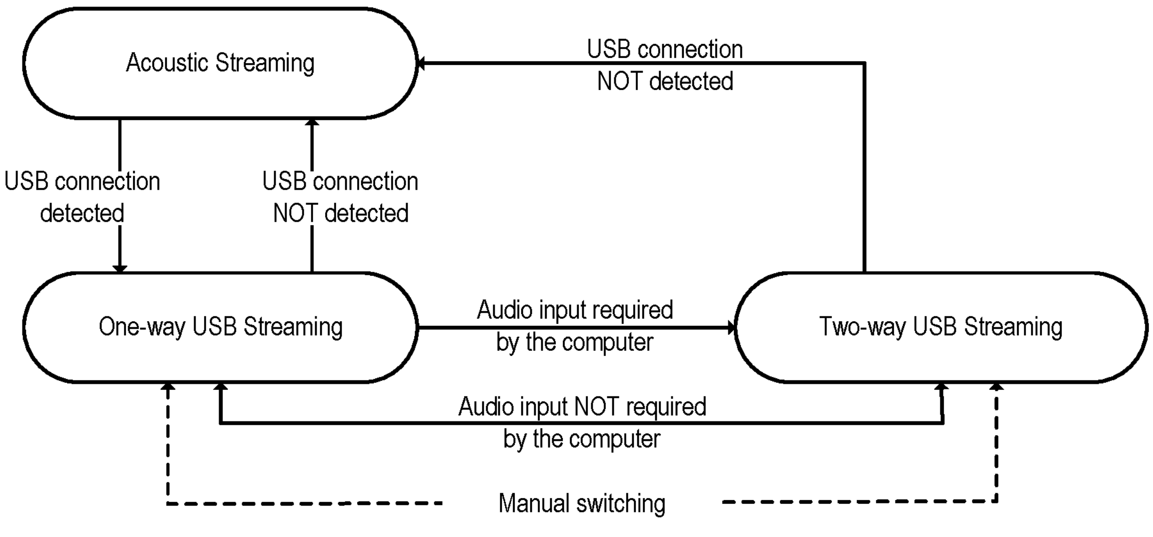
FIG. 6 is a schematic illustration of a first example of a streaming mode switching scheme.

A first example of a streaming mode switching scheme is illustrated in FIG. 6. In a first step, the assistive listening device 10 has to monitor or be notified about the existence of a connection 21 to a communication device 40 through the USB interface 20. This information is usually transmitted from the USB interface controller chip to the main controller ("control unit 38") of the assistive listening device 10. If no USB connection 21 to a communication device 40 is existing, the assistive listening device 10 will configure itself in the acoustic streaming state (i.e., the control unit 38 will select the first streaming mode). If a USB connection 21 is found to exist, the assistive listening device 10 will configure itself in the one-way USB streaming state (i.e., the control unit 38 will select the second streaming mode).

In a next step, if the communication device 40 requires an audio input (e.g. a conference call is established), it notifies the assistive listening device 10 via the USB connection 21 over the USB interface 20. Upon reception of that notification, the assistive listening device 10 will configure itself in the two-way USB streaming state (i.e., the control unit 38 will select the second streaming mode). If the communication device 40 no longer requires an audio input (e.g., the conference call has ended), it notifies the assistive listening device 10 over via the USB connection 21 the USB interface 20. Upon reception of that notification, the assistive listening device 10 will configure itself in the one-way USB streaming state (i.e., the control unit 38 will select the second streaming mode again).

When it is detected that the USB connection 21 is deactivated (e.g. the USB cable 21 is removed) while the assistive listening device 10 is in a one-way USB streaming state (second streaming mode) or in a two-way USB streaming state (third streaming mode), the assistive listening device will configure itself in the acoustic streaming state (i.e., the control unit 38 will select the first streaming mode again).

Additionally, when in the two-way USB streaming state, the assistive listening device 10 may be manually toggled to the one-way USB streaming state (and vice-versa), through a dedicated user interface 39 (button or else). This allows to override the automatic selection of the two-way USB streaming mode or the one-way USB streaming mode based on the detection of whether or not the communication device 40 requests a USB output audio signal.

Figure 7:
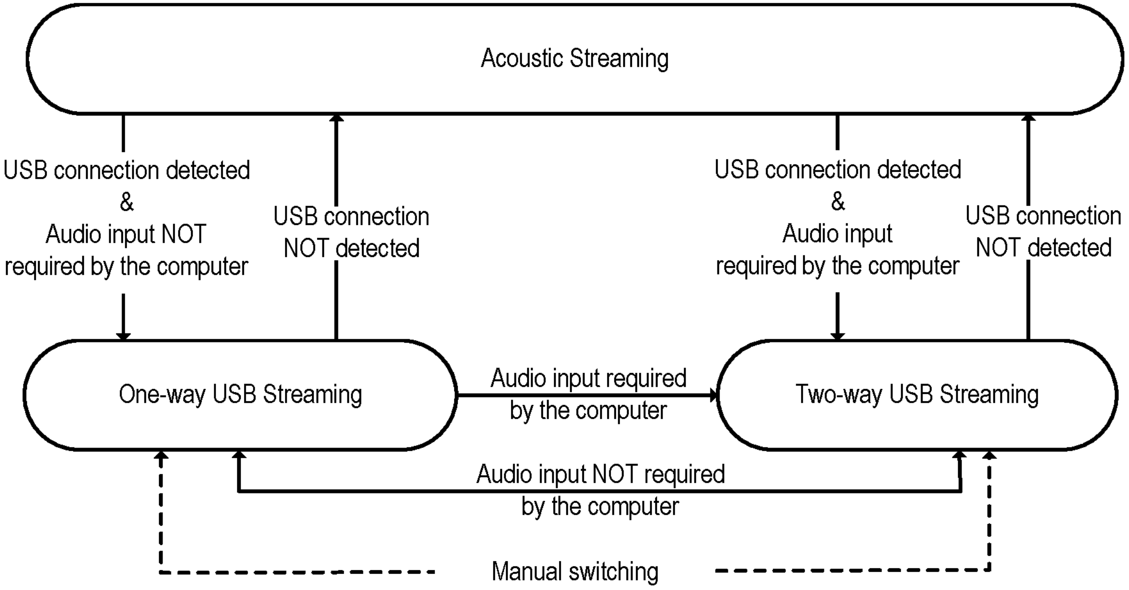
FIG. 7 is a schematic illustration of a second example of a streaming mode switching scheme.

Another example of a streaming mode switching scheme is illustrated in FIG. 7. It can be seen that the principle remains the same, but with this implementation it is possible to switch directly from the acoustic streaming state to the two-way USB streaming state, without switching first to the one-way USB streaming state. The other transitions remain identical.

In the examples described so far, the wireless connection 36 from the assistive listening device 10 to the hearing devices 52, 54 is represented as a stereo connection. There may be cases, however, for which there is only a monaural connection. This may be the case, for example, if the user 60 is only equipped with a hearing device on one side, or if the wireless receiver of the hearing devices 52, 54 supports a mono signal only.

The assistive listening device 10 may additionally detect which hearing device receiver type(s) are connected in the network, so that the assistive listening device 10 may switch between the standard stereo state and a downmixed mono state. In the case of the downmixed mono state, the stereo signal received form the communication device 40 would be first downmixed into a mono signal (e.g., by summing the left and right channel with −6 dB gain), and then supplied to the wireless interface 32 for transmission to the hearing device(s).

What is claimed is:

1. An assistive listening device comprising:

a microphone arrangement for capturing an input microphone audio signal from a sound environment, such as a user's voice;

a microphone signal processing unit for processing the input microphone audio signal so as to generate a processed microphone audio signal;

a USB interface for connecting to a communication device, the USB interface comprising a USB audio input port to receive a USB input audio signal from the communication device and a USB audio output port to transmit a USB output audio signal to the communication device;

a USB audio signal processing unit for processing the USB input audio signal so as to generate a processed USB input audio signal;

a wireless interface for transmitting an output audio signal via a wireless link to a hearing device; and a control unit for selecting one of a first streaming mode, a second streaming mode, and a third streaming mode and for operating the assistive listening device according to the selected streaming mode, wherein in the first streaming mode the processed microphone audio signal is supplied to the wireless interface as the output audio signal, with the first streaming mode being selected during times when no USB connection at the USB interface is detected;

in the second streaming mode the processed USB input audio signal is supplied to the wireless interface as the output audio signal, with the second streaming mode being selected during times when a USB connection to the communication device is detected and the communication device does not request a USB output audio signal;

in the third streaming mode the processed USB input audio signal is supplied to the wireless interface as the output audio signal and the processed microphone audio signal is supplied to the USB audio output port as the USB output audio signal, with the third streaming mode being selected when a USB connection to the communication device is detected and the communication device requests a USB output audio signal.

2. The assistive listening device of claim 1, wherein the USB interface and the USB audio signal processing unit are not active in the first streaming mode.

3. The assistive listening device of claim 1, wherein the microphone signal processing unit is not active in the second streaming mode.

4. The assistive listening device of claim 1, wherein the control unit is configured to allow in the second streaming mode to select an ambient sub-mode in which, in addition, an input microphone audio signal is captured, by the microphone arrangement, the input microphone audio signal is processed so as to generate a processed microphone audio signal, and the processed microphone audio signal is weighted and added to the processed USB input audio signal to generate a combined audio signal which is supplied to the wireless interface as the output audio signal.

5. The assistive listening device of claim 1, wherein the control unit is configured to allow in the third streaming mode to select a sidetone sub-mode in which, in addition, the processed microphone audio signal is weighted and added to the processed USB input audio signal to generate a combined audio signal which is supplied to the wireless interface as the output audio signal.

6. The assistive listening device of claim 1, wherein the control unit is configured to first check whether or not a USB connection at the USB interface is detected, wherein the first streaming mode is selected as long as no USB connection is detected, and wherein the second streaming mode is selected when a USB connection is detected and as long as no request for a USB output audio signal is received.

7. The assistive listening device of claim 6, wherein the control unit is configured to switch from the second streaming mode into the third streaming mode as soon as a request for a USB output audio signal is received.

8. The assistive listening device of claim 7, wherein the control unit is configured to switch from the second streaming mode or the third streaming mode, respectively, into the first streaming mode as soon as it is detected that the USB connection is no longer present.

9. The assistive listening device of claim 6, wherein the control unit is configured to allow a user to override an automatic streaming mode selection of the control unit so as to switch from the third streaming mode into the second streaming mode and optionally back by interaction with a user interface.

10. The assistive listening device of claim 1, wherein the control unit is configured to directly switch from the first streaming mode into the third streaming mode as soon as a USB connection is detected and a request for a USB output audio signal is received.

11. The assistive listening device of claim 1, wherein the USB input audio signal is a stereo audio signal and wherein the processed USB input audio signal is a stereo processed USB input audio signal.

12. The assistive listening device of claim 11, wherein the wireless interface is configured to transmit the processed USB input audio signal as a stereo signal to a binaural hearing system including the hearing device or wherein the assistive listening device is configured to downmix the stereo processed USB input audio signal into a mono signal to be transmitted by the wireless interface.

13. A hearing assistance system comprising the assistive listening device of claim 1, the hearing device, and the communication device.

14. The hearing assistance system of claim 13, wherein the communication device is configured to run at least one of an audio conference program or a video conference program, wherein the USB input audio signal is provided by the at least one of the audio conference program or the video conference program and the USB output audio signal is used by the at least one of the audio conference program or the video conference program.

15. A method of providing hearing assistance, comprising:

providing an assistive listening device comprising a USB interface, a microphone arrangement, a wireless interface and a control unit, selecting, by the control unit, one of a first streaming mode, a second streaming mode, and third streaming mode and operating the assistive listening device according to the selected streaming mode, wherein the first streaming mode is selected during times when no USB connection at the USB interface is detected, and in the first streaming mode an input microphone audio signal is captured, by a microphone arrangement, from a sound environment, such as a user's voice, the input microphone audio signal is processed so as to generate a processed microphone audio signal, and the processed microphone audio signal is supplied to the wireless interface for being transmitted to a hearing device;

the second streaming mode is selected during times when a USB connection to a communication device is detected and the communication device does not request a USB output audio signal, and in the second streaming mode a USB input audio signal received from the communication device via the USB interface is processed so as to generate a processed USB input audio signal, and the processed USB input audio signal is supplied to the wireless interface for being transmitted to the hearing device;

the third streaming mode is selected when a USB connection to the communication device is detected and the communication device requests a USB output audio signal, and in the third streaming mode the processed USB input audio signal is supplied to the wireless interface for being transmitted to the hearing device, an input microphone audio signal is captured, by the microphone arrangement, from the user's voice, the input microphone audio signal is processed so as to generate a processed microphone audio signal, and the processed microphone audio signal is supplied to the USB interface.

* * * * *